US008492507B2

(12) United States Patent
Rosenberg et al.

(10) Patent No.: US 8,492,507 B2
(45) Date of Patent: Jul. 23, 2013

(54) ACETYLENIC POLYAMIDE

(75) Inventors: Jan-Erik Rosenberg, Falkenberg (SE); David Persson, Malmö (SE); Elisbeth Kiraly, Stoby (SE); Mehrnoush Jowkar Deriss, Lund (SE)

(73) Assignee: Nexam Chemical AB, Lund (SE)

( * ) Notice: Subject to any disclaimer, the term of this patent is extended or adjusted under 35 U.S.C. 154(b) by 154 days.

(21) Appl. No.: 13/120,020

(22) PCT Filed: Feb. 25, 2009

(86) PCT No.: PCT/SE2009/000104
§ 371 (c)(1),
(2), (4) Date: Apr. 20, 2011

(87) PCT Pub. No.: WO2010/036170
PCT Pub. Date: Apr. 1, 2010

(65) Prior Publication Data
US 2011/0190469 A1 Aug. 4, 2011

(30) Foreign Application Priority Data

Sep. 23, 2008 (SE) .................................. 0802017
Dec. 17, 2008 (SE) .................................. 0802583

(51) Int. Cl.
*C08G 69/26* (2006.01)
(52) U.S. Cl.
USPC ........ 528/335; 525/202; 525/328.1; 525/420; 525/421; 528/310; 528/336
(58) Field of Classification Search
USPC ............... 525/420, 421, 202, 328.1; 528/310, 528/335, 336
See application file for complete search history.

(56) References Cited

U.S. PATENT DOCUMENTS

| | | |
|---|---|---|
| 1,103,305 A | 7/1914 | Lilliston |
| 3,321,440 A | 5/1967 | Lee |
| 3,484,411 A | 12/1969 | Matzner |
| 3,652,715 A | 3/1972 | Holub et al. |
| 3,770,697 A | 11/1973 | Holub et al. |
| 3,956,322 A | 5/1976 | Quinn et al. |
| 3,970,608 A | 7/1976 | Furukawa et al. |
| 4,145,466 A | 3/1979 | Leslie et al. |
| 4,176,101 A | 11/1979 | Leslie et al. |
| 4,221,895 A | 9/1980 | Woo |
| 4,283,551 A | 8/1981 | Chow et al. |
| 4,395,540 A | 7/1983 | St. Clair et al. |
| 4,638,083 A | 1/1987 | Hergenrother et al. |
| 4,835,197 A | 5/1989 | Mercer |
| 4,920,005 A | 4/1990 | Mercer |
| 4,973,707 A | 11/1990 | Nye |
| 4,980,481 A | 12/1990 | Lubowitz et al. |
| 5,001,218 A | 3/1991 | Coquard et al. |
| 5,066,771 A | 11/1991 | Hino et al. |
| 5,268,444 A | 12/1993 | Jensen et al. |
| 5,284,759 A | 2/1994 | Mader et al. |
| 5,344,982 A | 9/1994 | Hergenrother et al. |
| 5,374,701 A | 12/1994 | Hay et al. |
| 5,446,204 A | 8/1995 | Bryant et al. |
| 5,493,002 A | 2/1996 | McGrath et al. |
| 5,498,803 A | 3/1996 | Hergenrother et al. |
| 5,530,130 A | 6/1996 | Roschger et al. |
| 5,567,800 A | 10/1996 | Hergenrother et al. |
| 5,681,967 A | 10/1997 | Hergenrother et al. |
| 5,693,681 A | 12/1997 | Pfaendner et al. |
| 5,817,744 A | 10/1998 | Sheppard et al. |
| 5,827,927 A | 10/1998 | Gagne et al. |
| 5,864,050 A | 1/1999 | Taguchi et al. |
| 6,124,421 A | 9/2000 | Lau et al. |
| 6,139,920 A | 10/2000 | Smith et al. |
| 6,303,733 B1 | 10/2001 | Lau et al. |
| 6,316,639 B1 | 11/2001 | Fritz-Langhals |
| 6,344,523 B1 | 2/2002 | Hawthorne et al. |
| 6,495,657 B1 | 12/2002 | McDonald et al. |
| 7,015,304 B1 | 3/2006 | Chuang |
| 7,582,722 B1 | 9/2009 | Tan et al. |
| 2003/0064235 A1 | 4/2003 | Okawa et al. |
| 2004/0006196 A1 | 1/2004 | Scola et al. |
| 2004/0147710 A1 | 7/2004 | Yokotsuka et al. |
| 2005/0096452 A1 | 5/2005 | Higashimura et al. |
| 2005/0109993 A1 | 5/2005 | Komatsu |
| 2005/0136268 A1 | 6/2005 | Shin et al. |

(Continued)

FOREIGN PATENT DOCUMENTS

CA 2184441 3/1997
CN 87 1 04650 A 1/1988

(Continued)

OTHER PUBLICATIONS

Quinn, C.B., "The Flammability properties of Copolyesters and Copolycarbonates containing Acetylenes", Journal of Polymer Science, (1977), vol. 15, pp. 2587-2594.
Reghunadhan Nair, C.P., "Advances in addition-cure phenolic resins", Prog. Polymer Science, (2004), vol. 29, pp. 401-498.
Reghunadhan Nair, C.P. et al., "Thermal characteristics of addition-cure phenolic resins", Polymer Radiation Degradation and Stability, (2001), vol. 73, pp. 251-257.
Reghunadhan Nair, C.P. et al., "Phenyl ethynyl functional addition cure phenolic resins: Synthesis, characterization and thermal properties", Journal of Materials Science, (2001), vol. 36, pp. 4151-4157.
Reghunadhan Nair, C.P. et al., "Addition curable phenolic resins based on ethynyl phenyl azo functional novolac", Polymer, (2002), vol. 43, pp. 2609-2617.

(Continued)

*Primary Examiner* — Gregory Listvoyb
(74) *Attorney, Agent, or Firm* — Renner, Otto, Boisselle & Sklar, LLP

(57) ABSTRACT

Disclosed is an acetylenic polyamide and a composition comprising said acetylenic polyamide, which acetylenic polyamide. Said acetylenic group is suitably obtained by subjecting at least one acetylenic compound to reaction with either at least one polyamide, or at least one amino functional monomer and/or carboxylic acid, yielding a corresponding acetylenic amide monomer, oligoamide or polyamide. Amide monomers and/or oligoamides can subsequently be used in production of the acetylenic polyamide.

14 Claims, No Drawings

U.S. PATENT DOCUMENTS

| | | | |
|---|---|---|---|
| 2006/0052471 A1 | 3/2006 | Ashman et al. | |
| 2006/0235189 A1 | 10/2006 | Rink et al. | |
| 2006/0247411 A1 | 11/2006 | Inoue et al. | |
| 2007/0154843 A1 | 7/2007 | Kanada et al. | |
| 2007/0155949 A1 | 7/2007 | Beltz et al. | |
| 2007/0196619 A1 | 8/2007 | Carter et al. | |
| 2008/0076849 A1 | 3/2008 | Sato et al. | |

FOREIGN PATENT DOCUMENTS

| | | |
|---|---|---|
| CN | 1557856 | 12/2004 |
| CN | 1580096 | 2/2005 |
| CN | 1597734 | 3/2005 |
| CN | 101343362 | 1/2009 |
| CN | 101463135 | 6/2009 |
| CN | 101759546 | 6/2010 |
| DE | 2060918 A1 | 6/1971 |
| DE | 19820947 | 11/1998 |
| DE | 19821263 | 11/1998 |
| EP | 0 008 194 | 2/1980 |
| EP | 0 152 021 | 8/1985 |
| EP | 0 292 677 | 11/1988 |
| EP | 0 309 025 | 3/1989 |
| EP | 0 400 779 | 12/1990 |
| EP | 0 458 296 | 11/1991 |
| EP | 0 519 198 | 12/1992 |
| EP | 0 761 759 | 3/1997 |
| EP | 0 890 595 | 1/1999 |
| EP | 1 457 511 | 9/2004 |
| EP | 1 484 327 | 12/2004 |
| EP | 1 669 389 | 6/2006 |
| EP | 1 988 114 | 2/2007 |
| EP | 1 995 635 | 3/2007 |
| EP | 2 025 698 | 2/2009 |
| EP | 2 113 810 | 11/2009 |
| EP | 2 163 577 | 3/2010 |
| FR | 2385753 | 10/1978 |
| GB | 1 338 909 | 11/1973 |
| GB | 1 597 281 | 9/1981 |
| JP | 50-130839 | 10/1975 |
| JP | 50-130898 | 10/1975 |
| JP | 60219756 | 11/1985 |
| JP | 62288629 | 12/1987 |
| JP | 62292834 | 12/1987 |
| JP | 63095233 | 4/1988 |
| JP | 63146929 | 6/1988 |
| JP | 63146931 | 6/1988 |
| JP | 1098626 | 4/1989 |
| JP | 1115929 | 5/1989 |
| JP | 3081327 | 4/1991 |
| JP | 4028712 | 1/1992 |
| JP | 4214727 | 8/1992 |
| JP | 5043662 | 2/1993 |
| JP | 6056982 | 3/1994 |
| JP | 11157238 | 6/1999 |
| JP | 11172003 | 6/1999 |
| JP | 2002363261 | 12/2002 |
| JP | 2002363381 | 12/2002 |
| JP | 2003155330 | 5/2003 |
| JP | 2003213130 | 7/2003 |
| JP | 2004-132994 * | 4/2004 |
| JP | 2004224900 | 8/2004 |
| JP | 2004292506 | 12/2004 |
| JP | 2005047996 | 2/2005 |
| JP | 2007099969 | 4/2007 |
| JP | 2007216493 | 8/2007 |
| JP | 2010186055 | 8/2010 |
| JP | 2010186134 | 8/2010 |
| WO | 86/04073 | 7/1986 |
| WO | 90/10667 | 9/1990 |
| WO | 90/12342 | 10/1990 |
| WO | 91/09070 | 6/1991 |
| WO | 93/09079 | 5/1993 |
| WO | 94/19390 | 9/1994 |
| WO | 95/14742 | 6/1995 |
| WO | 97/09325 | 3/1997 |
| WO | 98/33837 | 8/1998 |
| WO | 98/38171 | 9/1998 |
| WO | 98/40422 | 9/1998 |
| WO | 98/51772 | 11/1998 |
| WO | 99/01607 | 1/1999 |
| WO | 02/22706 | 3/2002 |
| WO | 2006/093676 | 9/2006 |
| WO | 2007/094503 | 8/2007 |
| WO | 2008/029168 | 3/2008 |
| WO | 2010/030216 | 3/2010 |
| WO | 2010/036170 | 4/2010 |
| WO | 2010/036175 | 4/2010 |
| WO | 2010/071532 | 6/2010 |
| WO | 2010/072760 | 7/2010 |
| WO | 2010/074625 | 7/2010 |
| WO | 2010/086385 | 8/2010 |
| WO | 2010/087742 | 8/2010 |
| WO | 2011/128431 | 10/2011 |

OTHER PUBLICATIONS

Wang, Ming-Cun et al., "Polyarylacetylene Blends with improved processability and high thermal stability", Journal of Applied Polymer Science, (2007), vol. 105, pp. 2939-2946.

Wang, Ming-Cun et al., "Acetylene-grafted resins derived from phenolics via azo coupling reaction", European Polymer Journal, (2008), vol. 44, pp. 842-848.

Wong, David H. et al., "Synthesis and Characterization of Hyperbranched Poly(Arylene-Ether-Ketone-Imide)s Containing Phenylethynyl Groups", Polymer Preprints, (2005), vol. 46(1), pp. 793-794.

Li, Wanwan et al., "Crosslinkable poly(aryl ether ketone)s containing pendant phenylethynyl moieties: Synthesis, characterization and properties", Polymer, (2008), vol. 49, pp. 4080-4086.

Rao, Xianhua et al., "Design and Synthesis of a Tribranched Phenylethynyl-Terminated Aryl Ether Compound and Its Use as a Reactive Diluent for PETI-5", Journal of Polymer Science: Part A: Polymer Chemistry, (2007) vol. 45, pp. 4844-4854.

Ma, Xiaoye et al., "Synthesis and characterization of fluorinated poly(aryl ether ketone)s terminated with a phenylethynyl group", Materials Letter, (2006) vol. 60, pp. 1369-1373.

Ma Xiaoye et al., "Crosslinkable fluorinated poly(aryl ether ketone)s containg pendent phenylethynyl moieties for optical waveguide devices", Journal of Photochemistry and Photobiology A: Chemistry 188, (2007) pp. 43-50.

Ayambem, A. et al., "Endgroup substituent effects on the rate/extent of network formation and adhesion for phenylethynyl-terminated poly(arylene ether sulfone) oligomers", Polymer, (2000) vol. 41, pp. 5109-5124.

Simone C.D. et al., "Phenylethynyl End-Capped Polyimides Derived from 4,4'-(2,2,2-Trifluoro-1-phenylethylidene) diphthalic Anhydride, 4,4'-(Hexafluoroisopropylidene) diphthalic Anhydride, and 3,3', 4,4'-Biphenylene Dianhydride: Structure—Viscosity Relationship" Macromolecules, (2003), vol. 36, pp. 6780-6790.

Ayambem A. et al., "Synthesis, Characterization, and Cure Studies of Phenylethynyl-Terminated Poly(arylene ether sulfones)", Polymer Preprints, (1997), vol. 38(2), pp. 373-374.

Brown T.R. et al., "Investigation of Reaction Progress via Glass Transition Temperature of GRC-A Loaded with Zeolite L", Polymer Preprints, (2008), vol. 49(1), p. 508.

Ayambem A. et al., "Cure, Adhesion and Composite Applications of Substituted Phenylethynyl Terminated Poly(arylene ether sulfone)s", International, SMAPE Symposium and Exhibition, (1998), pp. 171-180.

Brown T.R. et al., "Investigation of the Dynamic Melt Rheology of GRC-A Loaded with Zeolite L", Polymer Preprints, (2008), vol. 49(1), pp. 509-510.

Han Seung San et al., "Synthesis and characterization of new polyimides containing ethynylene linkages", European Polymer Journal, (2007) vol. 43(4), pp. 1541-1548.

Sun Hongjie et al., "Phenylethynyl terminated oligoimides derived from 3,3',4,4'—diphenylsulfonetetracarboxylic dianhydride and their adhesive properties", European Polymer Journal, (2009), vol. 45, pp. 1169-1178.

Marks, M.J. et al., "Branching by Reactive End Groups. III. Synthesis, Branching, and Analysis of m-Ethynylphenol/p-t-Butylphenol-Coterminated Bisphenol A Polycarbonates", Journal of Polymer Science: Part A: Polymer Chemistry, (2000) vol. 38, pp. 2352-2358.

Cella James A. et al., "Copolymers Derived from Phenol Functional Telechelic Oligofluorenes", Organic Light Emitting Materials and Devices X, Proceedings of SPIE—The International Society for Optical Engineering, (2006), vol. 6333, pp. 633301-1-633301-10.

Mazhar, Iqbal et al., "All-Aromatic Liquid Crystalline Thermosets with High Glass Transition Temperatures", Journal of Polymer Science: Part A: Polymer Chemistry, (2009), vol. 47, pp. 1368-1380.

Knijnenberg, A. et al., "Synthesis and Characterization of Aryl Ethynyl Terminated Liquid Crystallline Oligomers and their Cured Polymers", Macromolecules, (2006), vol. 39, pp. 6936-6943.

Zentel, R. et al., "Synthesis and non-linear optical characteristics of crosslinked and linear epoxy polymers with pendant tolane chromophores", Makromolecular Chemistry, (1993), vol. 194, pp. 859-868.

Goodson, Theodore, et al., "The Synthesis, Characterization, and Photochemical Crosslinking of an NLO Epoxy Polymer", Journal of Nonlinear Optical Physics and Materials, (2005), schedule 1.

Ochiai, Bungo et al., "Investigation on Radical Polymerization Behavior of 4-Substituted Aromatic Enynes. Experimental, ESR, and Computational Studies", Macromolecules, (2001), vol. 34, pp. 1634-1639.

Desales, Raul et al., "Free radical copolymerization of 4-phenylbut-1-en-3-yne with methylmethacrylate", Polymer Bulletin, (1996), vol. 36, pp. 287-293.

Reghunadhan, C.P. et al., "Condensation-Addition-Type Resole Resins with Phenyl Ethynyl Functions: Synthesis, Characterization, and Thermal Properties", Journal of Applied Polymer Science, (2001), vol. 81, pp. 3371-3377.

Hergenrother, P.M. et al., "Acetylene-Terminated Imide Oligomers and Polymers Therefrom", Polymer Preprints, American Chemistry Society, (1980), vol. 21(1), pp. 81-83.

Connell, J.W. et al., "Oligomers and Polymers Containing Phenylethynyl Groups", Journal of Macromolecular Science, Part C: Polymer Reviews, (2000), vol. 40(2&3), pp. 207-230.

Wolff, Oliver et al., "3-Substituted Phthalic Acid Derivatives by Sonogashira Coupling Reaction", Synthesis, (2007), No. 5, pp. 0761-0765.

Dunson, Debra "Synthesis and Characterization of Thermosetting Polymide Oligomers for Microelectronics Packaging", Virginia Polytechnic Institute and State University, (2000).

International Search Report mailed Feb. 16, 2010 from copending International Application No. PCT/EP2009/067746.

International Search Report mailed Mar. 31, 2010 from copending International Application No. PCT/EP2010/051023.

International Search Report mailed Jun. 24, 2011 from copending International Application No. PCT/EP2011/055992.

International Search Report mailed Nov. 23, 2009 from copending International Application No. PCT/SE2009/000102.

International Search Report mailed Oct. 21, 2009 from copending International Application No. PCT/SE2009/000103.

International Search Report mailed Nov. 11, 2009 from copending International Application No. PCT/SE2009/000104.

International Search Report mailed Oct. 20, 2009 from copending International Application No. PCT/SE2009/000107.

International Search Report mailed Oct. 28, 2009 from copending International Application No. PCT/SE2009/000112.

International Search Report mailed Dec. 18, 2009 from copending International Application No. PCT/SE2009/000419.

Eichhorn et al., "Characterization of Low Molecular Weight Carboxyl-Terminated Polyamides Obtained by Reactive Extrusion of Polyamide 6 with Trimellitic anhydride", Journal of Applied Polymer Science, vol. 62, 1996, pp. 2053-2060.

* cited by examiner

ACETYLENIC POLYAMIDE

This application is a national phase of International Application No. PCT/SE2009/000104 filed Feb. 25, 2009 and published in the English language, which claims priority to Application No. SE 0802017.4 filed Feb. 23, 2008 and Application No. SE 0802583.5 filed Dec. 17, 2008.

The present invention refers to an acetylenic polyamide and a composition comprising said acetylenic polyamide. The acetylenic polyamide is obtained by incorporation of at least one acetylenic compound, having at least one carbon-carbon triple bond, into a polyamide. In further aspects the present invention refers to a composition comprising said acetylenic polyamide and a moulded article obtained from said acetylenic polyamide or said composition.

Acetylenic above and hereafter refers to any chemical compound, including monomers, oligomers and polymers, and/or any chemical group, which compound or group has at least one carbon-carbon triple bond.

Polyamides are polymers comprising recurring amide groups as integral parts of the main polymer chain. They can occur both naturally, examples being proteins such as wool and silk, and can be made artificially, examples being nylons, aramids and alkali, such as sodium, poly(aspartates). Nylon is a commonly used designation for the family of synthetic polymers known generically as polyamides. The amide link can for instance be produced by condensation reaction of an amino group and a carboxylic acid, anhydride or acid halide group. The amino groups and the carboxylic acid, anhydride or halide groups can be on the same monomer, such as an amino acid having at least one amino group and at least one carboxylic acid group, or the polymer can be built up from two or more different di, tri or polyfunctional monomers, such as one with two or more amino groups and one with two or more carboxylic acid, anhydride or acid halide groups.

Polyamides are typically condensation polymers formed by reacting equal parts of for instance a diamine and a dicarboxylic acid and a numerical suffix is often used to specify the number of carbons donated by the monomers, the amine first and the carboxylic acid second. The most common variant is polyamide 6,6 which refers to the fact that the diamine, hexamethylene diamine, and the diacid, adipic acid, each donate 6 carbons to the polymer chain. Accordingly, polyamide 5,10 is built up from pentamethylene diamine and sebacic acid, polyamide 6,12 is a polyamide obtained from a $C_6$ diamine and a $C_{12}$ diacid, and similarly for polyamide 6,11, polyamide 10,12, and so on.

Further polyamides include polylactams which are not condensation polymers, but formed by a ring-opening polymerisation of a lactam, such as caprolactam yielding polycaprolactam also known as polyamide 6, aromatic polyamides, such as aramids, polymerised by the addition of aromatic di, tri or polyfunctional acids like terephthalic and isophthalic acid, copolymers of polyamide 6,6 and polyamide 6 and starbranched polyamides produced by condensation of for instance dicarboxylic acids with amines having three or more amino groups.

Polyamides are recognised as exhibiting good abrasion resistance, low friction coefficient, good resistance to heat and good impact resistance. Polyamides are in dry conditions good electrical insulators. Polyamides are typically hygroscopic and absorb water. This absorption will change some properties, such as insulation, tensile strength and stiffness. The impact resistance is increased by a higher content of water.

There are, despite the fact that polyamides have excellent physical and chemical properties and for a long time have been widely used for resins, films, fibres, moulded articles and so on, demands for improved and/or modified properties, such as increased operational temperatures and retained properties during and after exposure to for instance harsh temperature, atmosphere, mechanical and radiation conditions.

It has now quite unexpectedly been found that an acetylenic polyamide can be obtained by incorporation of one or more carbon-carbon triple bonds into a polyamide, for instance as endcapping group(s), as pendant group(s) along the molecular backbone and/or as group being part of the molecular backbone. The acetylenic polyamide of the present invention meets said demands for improved and/or modified properties exhibiting an excellent combination of toughness, resistance and thermooxidative stability.

The present invention accordingly refers to an acetylenic polyamide obtained by incorporation of at least one acetylenic carbon-carbon triple bond derived from at least one acetylenic compound, having said at least one carbon-carbon triple bond.

Embodiments of said acetylenic compound include acetylenic aromatic compounds of Formula I through VIII

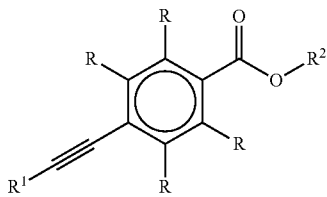

Formula I

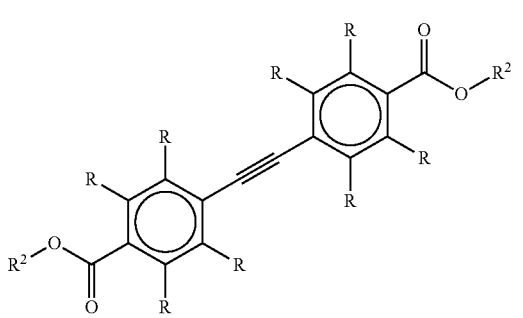

Formula II

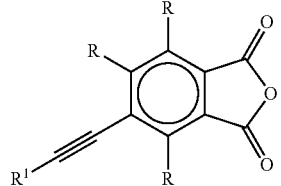

Formula III

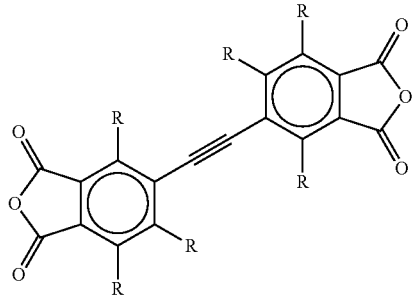

Formula IV

-continued

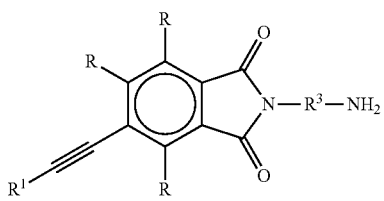

Formula V

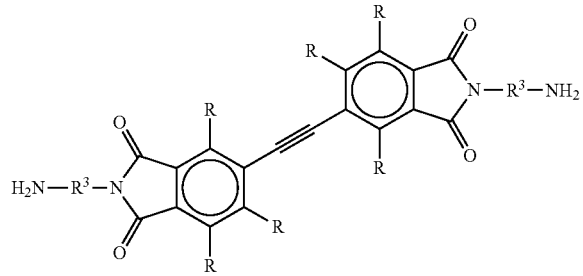

Formula VI

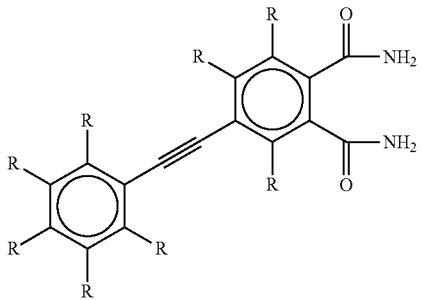

Formula VII

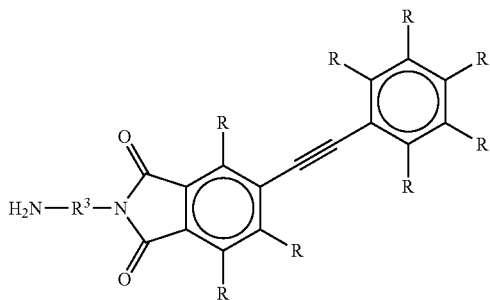

Formula VIII wherein the position in the aromatic ring of the acetylenic (carbon-carbon triple bond) is variable and wherein each substituent R individually is hydrogen or a hydroxy, halo or amino group or a linear or branched alkyl, alkenyl, alkynyl, aminoalkyl, aminoalkenyl, aminoalkynyl, haloalkyl, haloalkenyl, haloalkynyl, hydroxyalkyl, hydroxyalkenyl, hydroxyalkynyl, hydroxyacyl or aminoacyl group or an aryl, hydroxyaryl or aminoaryl group, each substituent $R^1$ individually is hydrogen or a hydroxy or halo group or a linear or branched alkyl, alkenyl, hydroxyalkyl, hydroxyalkenyl, haloalkyl or haloalkenyl group, each $R^2$ individually is a linear or branched alkyl, alkenyl, alkynyl or acyl group and each $R^3$ individually is a linear or branched alkyl, alkenyl or alkynyl group or an aryl group.

Further suitable embodiments of said acetylenic compound are found in the group consisting of acetylenic linear or branched aliphatic, cycloaliphatic or aromatic carboxylic acids, anhydrides and corresponding acid halides and alkyl esters, such as alkynyl, alkylalkynyl and arylalkynyl o-phthalic acids and anhydrides, alkynyl and arylalkynyl isophthalic acids, alkynyl and arylalkynyl terephthalic acids, alkynyl and arylalkynyl benzoic acids, alkynyl and arylalkynyl adipic acids, alkynyl and arylalkynyl azelaic acids, alkynyl and arylalkynyl sebacic acids, alkynyl and arylalkynyl furandicarboxylic acids and corresponding acid halides and alkyl esters.

Said aryl is above and hereinafter preferably phenyl or naphthyl, said alkyl likewise preferably linear or branched, aliphatic or cycloaliphatic $C_1$-$C_8$ alkyl, such as methyl, ethyl, propyl or butyl, said alkenyl likewise preferably aliphatic or cycloaliphatic, linear or branched $C_2$-$C_8$ alkenyl, such as ethenyl, propenyl or butenyl, and said alkynyl likewise preferably aliphatic or cycloaliphatic, linear or branched $C_2$-$C_8$ alkynyl, such as ethynyl, propynyl or butynyl.

The most preferred embodiments of said acetylenic compounds can be exemplified by ethynyl o-phthalic anhydride, methylethynyl o-phthalic anhydride, phenylethynyl o-phthalic anhydride, naphthyl ethynyl o-phthalic anhydride, ethynyl isophthalic acid, methylethynyl isophthalic acid, phenylethynyl isophthalic acid, naphthyl ethynyl isophthalic acid, ethynyl terephthalic acid, methylethynyl terephthalic acid, phenylethynyl terephthalic acid, naphthyl ethynyl terephthalic acid, ethynyl benzoic acid, methylethynyl benzoic acid, phenylethynyl benzoic, naphthyl ethynyl benzoic acid, ethynyl adipic acid, methylethynyl adipic acid, phenylethynyl adipic acid, naphthyl ethynyl adipic, ethynyl azaleic acid, methylethynyl azaleic acid, phenylethynyl azaleic acid, naphthyl ethynyl azaleic, ethynyl sebacic acid, methylethynyl sebacic acid, phenylethynyl sebacic acid, naphthyl ethynyl sebacic, ethynyl 2,5-furandicarboxylic acid, methylethynyl 2,5-furandicarboxylic acid, phenyl ethynyl 2,5-furandicarboxylic acid, naphthyl ethynyl 2,5-furandicarboxylic acid and/or a corresponding acid halide or alkyl ester.

Said acetylenic polyamide is in preferred embodiments a linear or branched aliphatic, cycloaliphatic and/or aromatic acetylenic polyamide comprising monomer units derived from at least one said acetylenic compound and in addition thereto at least one linear or branched aliphatic, cycloaliphatic or aromatic di, tri or polyfunctional amine and at least one linear or branched aliphatic, cycloaliphatic or aromatic di, tri or polyfunctional carboxylic acid or anhydride or a corresponding acid halide or alkyl ester and/or at least one aliphatic, cycloaliphatic or aromatic aminoacid and/or at least one lactam. Said amine, aminoacid and/or lactam has preferably 1-18, such as 2-12, carbon atoms and said carboxylic acid or anhydride has likewise preferably 2-18, such as 3-12 carbon atoms. Said acetylenic polyamide comprises in its most preferred embodiments amine functional monomer units derived from the group consisting of hexamethylene diamine, pentamethylene diamine, 2,2,4-trimethyl-hexamethylene diamine, 2,4,4-trimethyl-hexamethylene diamine, 1,4-diaminobutane, 11-aminoundecanoic acid, 12-aminodecanoic acid, aminocaproic acid, 1,2-diaminobenzene, 1,3-diaminobenzene, 1,4-diaminobenzene and carboxyfunctional monomer units derived from the group consisting of oxalic acid, maloic acid, adipic acid, sebacic acid, isophthalic acid, terephthalic acid and 2,5-furandicarboxylic acid. Further preferred monomer units include those derived from for instance caprolactam and laurolactam.

Said acetylenic group(s) is/are in preferred embodiments of the present invention either obtained by (A) subjecting at least one said acetylenic compound to reaction with at least one polyamide, (B) subjecting at least one said acetylenic compound to reaction with at least one said amine, aminoacid and/or lactam yielding a corresponding acetylenic amide monomer or oligomer, which acetylenic amide monomer or oligomer subsequently is used in production of a said acetylenically crosslinkable polyamide or (C) subjecting at least one said acetylenic compound to co-polymerisation with at least one said amine, aminoacid and/or lactam and at least one said carboxylic acid or anhydride or a corresponding acid halide or alkyl ester, yielding a corresponding acetylenic oligoamide or a polyamide. A yielded acetylenic oligoamide can be used in production of a said acetylenic polyamide. Said reaction(s) and/or polymerisations is/are suitably performed in presence of an effective amount of at least one catalyst initiating and/or promoting said reaction(s) and/or is/are performed in an inert atmosphere.

Said acetylenic compound is in said preferred embodiments present in said acetylenic polyamide in an amount corresponding to at least 0.1 mole %, such as between 1 and 30 mole %, of the total molar amount of monomers, oligomers and/or polymers used in production of the acetylenic polyamide of the present invention.

The purpose of the present invention is to modify the mechanical properties of polyamides and compositions comprising polyamides. Among these modifications of properties can be mentioned: higher softening temperature, higher E-modulus and improved ability to counteract creep strain.

It is understood that the acetylenic group of the acetylenic polyamide of the present invention can be arranged as an endcapping, in-chain and/or pendent group. This will, of course in it self give different properties to the polymer after curing.

It is possible to further modify the mechanical properties by using methods known in the art together with the acetylenic polyamide and/or the composition herein disclosed. The purpose of such modifications is typically to reinforce for strength, to fill for higher density, dimension stability and higher stiffness, adding of conductive materials for avoiding static charging and pigmentation for aesthetic properties.

It is known in the art to add different types of fibres as reinforcements. Fibres suitable for use together with the acetylenic polyamide and/or the composition of the present invention can be exemplified by glass fibres, carbon fibres, steel fibres, aramide fibres, natural organic fibres, such as cellulose fibres, flax fibres, cotton fibres and silk. However, most organic and inorganic fibres that are able to withstand the process temperatures may prove useful. It is also possible to use fullerenes for reinforcing as well as for changing other mechanical properties.

Fillers are typically used for increasing dimension stability even though a few other mechanical properties, such as density, rigidity and acoustic properties may be altered by means of fillers. Fillers may be organic like cellulose or inorganic, such as minerals like for instance mica, lime and talcum.

It is furthermore possible to add stabilisers to said acetylenic polyamide and/or said composition, such as compounds stabilising towards exposure to ultraviolet light, heat or other exposure that may cause for instance polymer chain breakdown. One may in this context also mention the possibility to add different kinds of fire retarding agents to the polymer.

It is furthermore possible to modify the properties of the acetylenic polyamide and/or the composition according to the present invention by means of a plasticisers, lubricants or impact modifiers yielding for instance a polymer with elastic properties having improved thermal stability. It is also possible to utilise the present invention together with polymer blends as well as copolymers.

The electrical properties of the acetylenic polyamide and/or the composition of the present invention may also be modified within the scope of the invention. This may be achieved by adding for instance an insulation modifier. The most common modifier is carbon black which is used in smaller quantities to achieve antistatic properties. By adding more carbon black, the acetylenic polyamide and/or the composition may exhibit receive from dissipating properties to conducting and shielding properties. There are besides carbon black also other known substances and compounds used for obtaining above or portions of thereof. Metal fibres, carbon fibres and metal powder are only a few examples of such materials. Some of these materials also serve the purpose of reinforcing and filling agents.

Said acetylenic polyamide and/or said composition may also be expanded to change the density and thermal insulation property by adding a blowing, expanding or foaming agent. This may of course be used in combination with other additives.

It is in some applications also advantageous to modify the surface properties of the acetylenic polyamide and/or the composition. One such way is by adding anti-microbial agents for which the purpose is obvious. Another way is by adding so called tackifiers increasing friction if and when needed.

In a further aspect, the present invention refers to a composition comprising at least one acetylenic polyamide as disclosed above. The composition can in various embodiments further comprise at least one additional polymer, such as at least one additional polyamide and/or at least one filler, reinforcement, pigment, plasticiser and/or any other additive known in the art. Said acetylenic polyamide is in preferred embodiments of said composition preferably present in an amount of between 0.1 and 99.9, such as between 1 and 40 or between 1 and 25, % by weight of said composition.

In yet a further aspect, the present invention refers to a moulded three-dimensional article obtained by moulding at least one acetylenic polyamide as disclosed above or at least one composition likewise disclosed above. The acetylenic polyamide is for instance, upon and/or subsequent said moulding, crosslinked by heat, provided externally or in situ generated, induced crosslinking reaction of its acetylenic group(s), optionally in presence of an effective amount of at least one compound promoting crosslinking reactions of acetylenic polymers, such as a sulphur or an organic sulphur derivative as disclosed in for instance U.S. Pat. No. 6,344,523 and/or a radical initiator.

Curing of the herein disclosed acetylenic polyamide and/or the herein disclosed composition are advantageously initiated by providing the mould, the inlet or the hotrunner with a choking valve or check valve arrangement creating heat in the polymer through friction caused during the injection phase. The valve arrangement may be a solid arrangement whereas the generated heat is guided through the velocity of injection. There are numerous ways to guide the injection velocity.

One way to guide the velocity is through PLC (Programmable Logic Controller) used for guiding the injection moulding parameters of most modern injection moulding machines. The operator will then have to perform a series of trials where he in small steps increase the injection speed until the threshold temperature in the valve arrangement is sufficient to initiate the curing process. The valve arrangement is advantageously made adjustable for the same purpose.

Another way is to guide the process actively by using a temperature sensor in the mould and/or in the valve arrangement. A pressure sensor advantageously arranged just before the valve arrangement, optionally with a second pressure sensor arranged after the valve arrangement, may serve the same purpose as it indicates the pressure drop and thereby the friction generated. The temperature and pressure sensor(s) may also be used in combination. The data generated from these sensor(s) are then used as process data for guiding the injection moulding cycle. This data may then be used for guiding the injection sequence through direct guiding or so-called statistical process guiding. Statistical process guiding is especially advantageous where there is a risk for measurement lag, data delay or process guiding resonance in the process.

It is also possible to design in such a way that choking portions in the mould itself will constitute a part of the article produced. It will in this way be possible to:
a) manufacture articles that due to its size or through very quick curing of used polymers otherwise would be impossible to manufacture, and/or,
b) manufacture articles wherein only certain portions are cured, while other portions have the properties of an uncured polymer.

It is furthermore possible to actively guide the orifice size of the check valve thus allowing the temperature profile to be guided through other means than only the injection speed. This can for example be achieved through means of an hydraulic actuator constantly adjusting the size of the opening through the check valve. This guiding can be performed through PLC data only or by the aid of measuring data in the mould and/or around the valve as described above.

The check valve may also be provided with guided heating and/or cooling, either as a replacement for mechanically adjusting the orifice size, or as a complement thereto. Also this can be guided through PLC data only or by the aid of measuring data in the mould and/or around the valve as described above.

The mould is advantageously provided with one or more temperature sensors for the purpose of detecting the exothermic heat caused by the curing process. It is suitable to arrange several such sensors along the flow path of the polymer in order to detect variations in the curing in different portions of the article produced. These measurements are suitably used for statistical process guiding.

Similar principles as described above may be used in extrusion moulding. It will, however, be rather easy to achieve a favourable temperature profile for the curing where the polymer material is first plasticised, then heated further in the extrusion mould to initiate the curing while the later portions of the extrusion mould will cool the article enough to keep its shape. The continuos nature of the process is well suited for the curing of the acetylenic polyamide and/or the composition herein disclosed. Further heating is advantageously achieved by heating a predetermined portion of the extrusion mould by means of an external heat source. This will allow the operator to guide the curing process not having to rely completely on the extrusion velocity for heat generation.

The herein disclosed acetylenic polyamide and the herein disclosed composition are also well suited for use in a compression moulding process. A predetermined amount of polymeric material can here be preheated to a temperature somewhat under the curing temperature and placed in an open mould. The mould is then closed so that the polymeric material is distributed in the mould as is the normal procedure in compression moulding. The preheating, the mould temperature, the viscosity of the polymeric material and the compression pressure is adapted so that the friction and compression pressure will generate the heat needed to initiate the curing. It is also in a compression moulding process advantageous to provide the mould with one or more temperature and/or pressure sensors for the purpose of detecting the exothermic reaction during the curing.

The viscosity of the polymeric material during processing may be altered by means of rheology modifiers in order to obtain desired process parameters.

The temperature initiating curing is depending on the structure of the acetylenic portion of the acetylenic polyamide and will have to be adapted to avoid material break down of the polymer chain on curing. There are several ways to modify the acetylenic portion as disclosed in the present application. There is also the possibility to modify the curing temperatures by utilising a catalyst or initiator as disclosed above. Said catalysts have proven to radically lower the curing initiation temperature. It is also possible to add coupling agents.

It is, according to one alternative embodiment of the invention possible to perform at least a portion of the curing after the moulding process. This can for example be performed through electron beam (EB) curing or ultraviolet (UV) curing. This will also call for the need of for instance one or more photoinitiators. In most applications only a surface curing can be achieved through means of UV curing since the thermoplastic polymer is not transparent, however EB curing will be possible to utilise even for opaque polymers.

It is also possible to continue an initiated curing at a lower temperature. The article produced is here after the moulding procedure placed in an oven for a period of time ranging from half an hour to a couple of days. This process is known as baking. In order to keep important portions of the article, such as the flange portion of an oil pan, within desired tolerances the article may be arranged on a jig during the curing process.

A surface curing can be performed through corona treatment or flash heating. It will through this process be possible to cure the surface of a produced article without softening the polymeric material.

The herein disclosed acetylenic polyamide and composition are, due to the improved mechanical properties such as improved thermal stability and E-modulus allowing said acetylenic polyamide and/or said composition to be used at higher temperatures then possible with prior art polymers, well suited for manufacturing of a great number of articles.

Suitable and typical application areas will be found within, but not limited to, civilian and military transportation vehicles, such as cars, trucks, busses, motorcycles, trains, ships and aircrafts as well as recreational vehicles wherein for instance demands for weight reduction is an increasing demand.

Automotive, aeronautic and aerospace components suitably produced from the acetylenic polyamide and/or the composition of the present invention comprise, but are not limited to, for instance exterior body panels and glazing, such as back lights, door panels, fenders, panoramic roofs, roof modules, tailgates, heat shields, armours and spall linings. Further suitable articles include exterior components, such as vent grilles, door handles, front grilles, mirror systems, roof racks, running boards, spoilers, tank flaps, wheel housings and wheel covers as well as traditional after market products. It is also possible to produce larger components for trucks, busses, ships and aircrafts. Said acetylenic polyamide and/or said composition may furthermore be used in lighting, such as fog lamp lenses, reflectors and housings; headlamp bezels, housings, lenses and reflectors; lamp support brackets; projector lamp reflectors and holders; rear combination lamp housings, reflectors and lenses. These can be base coated, primed for painting, direct metallised and/or moulded in colour. The acetylenic polyamide and/or the composition of the present invention may also be used for other structural as well as interior components, such as composite headliners, energy absorption systems, front end modules, instrument panels, interior trimmings, load floors, pedestrian energy absorption systems and storage bins, as well as parts suitable for motorcycles, such as no-paint parts, tanks, fairing, chassis, frames, luggage containers and racks, as well as motorcycle rider safety items, such as helmets and all sorts of shields. The acetylenic polyamide and the composition herein disclosed may also be used in power train parts, such as air intake, automotive gears, wire coatings, brackets, sealings, electronic and electronic housings, fuel system components, pulleys, sensors, throttle bodies, transmissions and transmission parts, and valve rocker covers as well as other components in vehicle engine bays wherein heat may render prior art polymers insufficient.

Further suitable application areas of the acetylenic polyamide and/or the composition of the present invention include, but are not limited to, articles used in home entertainment, such as television apparatus and equipment, projectors and audio devices, as well as mobile entertainment and information carriers and communication devices. Further application areas include communication devices such as antennas, satellite dishes, articles and devices for recreation, entertainment and sport activities wherein for instance the weight to strength ratio is important, such as light weight components in extreme sport equipment including body protection, parts to mountain bikes, heat shields and the like. Further suitable applications include articles such as fishing rods and golf clubs.

A further industry having demands on higher mechanical strength, sometimes under elevated temperatures, is the packaging industry. The acetylenic polyamide and/or the composition according to the present invention will solve a number of problems linked to medium to long term storage under for instance elevated temperatures. Furthermore, creep strain in polymers, which today is a problem calling for over-dimensioning of carrying structures made of polymeric materials, can be eliminated or reduced by use of the acetylenic polyamide and/or the composition of the present invention.

It is also advantageous to utilise the acetylenic polyamide and/or the composition herein disclosed in household, building and construction industry. Said acetylenic polyamide and/or said composition can here be used for beams, girders, rails, panels, window frames and sub assemblies, roofing, flooring, doors and door frames, handles, knobs, cabinets, housings, kitchen appliances and central heating and energy recovery systems as well as for solar energy collectors and other parts of solar and wind energy and heating systems and equipment. Further application areas can be found among electrical components, equipment and installations, such as circuit breakers, films, flexible and rigid wire coatings, housings and discrete components.

The herein disclosed acetylenic polyamide and/or composition are also suitably used in health care, including man and animal, and laboratory equipment such as cardiovascular and blood care equipment, oxygenators, filters, pumps, masks, sleep therapy equipment, drug delivery devices, inhales, syringes, injection devices, stopcocks and valves as well as orthopaedic equipment, external bone fixation, joint trials, mechanical instruments, surgical instruments, electrosurgical instruments, endomechanical instruments and access devices as well as sub components and spare parts to the above. Said acetylenic polyamide and/or said composition can furthermore be used for supporting, diagnostic and monitoring equipment, such as hand instruments, equipment for imaging, ocular devices, dental devices, laboratory ware and vials as well as sterilisation trays.

Without further elaboration, it is believed that one skilled in the art can, using the preceding description, utilise the present invention to its fullest extent. The following preferred specific embodiments are, therefore, to be construed as merely illustrative and not limitative of the remainder of the disclosure in any way whatsoever. In the following, Examples 1-3 refer to preparation of acetylenically crosslinkable polyamides according to embodiments of the present invention.

EXAMPLE 1

Step 1: 30 parts by weight of phenyl ethynyl phthalic anhydride was charged in a reaction vessel and dissolved at room temperature and under nitrogen purge in 50 parts by weight of tetrahydrofuran and 150 parts by weight of chloroform. 14.8 parts by weight of hexamethylene diamine was subsequently during 5 minutes added to the mixture. The temperature increased by 15-20° C. due to the exothermic reaction. The temperature was further increased and kept at 55° C. for two hours during which a solid was formed. The reaction was stopped and the solvents were removed. Obtained product was for 24 hours dried in an oven at 60° C. to yield a yellowish solid acetylenic amide monomer. GC analysis confirmed that both the organic solvent and the product contained less than 0.2% by weight of unreacted phenyl ethynyl phthalic anhydride and thus a conversion of almost 100%.

Step 2: 86.1 parts by weight of hexamethylene diamine, 26.5 parts by weight of triethylamine and 3.9 parts by weight of the acetylenic amide monomer obtained in Step 1 were charged in a reaction vessel, equipped with nitrogen purge, and dissolved in 173 parts by weight of chloroform. The mixture was mechanically stirred at room temperature and 89.1 parts by weight of adipoyl chloride dissolved in 35 parts by weight of chloroform was added during 5 minutes. The reaction mixture was left over night at slow stirring. Chloroform and excess of triethylamine were now removed by evaporation and the mixture was poured into 1000 parts by weight of water and was allowed to agitate for 2 hours. The solid was filtered off and washed with 50 parts by weight of HCl (1M) followed by washing with 3×100 parts by weight of water. Obtained solid product was dried at 55° C. for 6 hours to give a yellowish acetylenic polyamide 6,6 having a melting point of 250° C. as determined by DSC analysis and an acetylenic content corresponding to 12% by weight of bonded phenyl ethynyl phthalic anhydride.

EXAMPLE 2

86.1 parts by weight of hexamethylene diamine, 26.5 parts by weight of triethyl amine and 6.45 parts by weight of the acetylenic amide monomer obtained in Step 1 of Example 1 were charged in a reaction vessel, equipped with nitrogen purge, and dissolved in 173 parts by weight of chloroform. The mixture was mechanically stirred at room temperature and 94 parts by weight of adipoyl chloride dissolved in 35 parts by weight of chloroform was added during 5 minutes. The reaction mixture was left over night at slow stirring. Chloroform and excess of triethyl amine were now removed by evaporation and the mixture was poured into 900 parts by weight of water and was allowed to agitate for 2 hours. The solid product was filtered off and washed with 50 parts by weight of HCl (1M) followed by washing with 3×75 parts by weight of water. Obtained solid product was dried at 55° C. over night yielding a yellowish acetylenic polyamide 6,6 having a melting point of 251° C. as determined by DSC analysis and an acetylenic content corresponding to 17% by weight of bonded phenyl ethynyl phthalic anhydride.

EXAMPLE 3

Step 1: 167.1 parts by weight of dimethyl adipate and 123.6 parts by weight of hexamethylene diamine were charged in a reaction vessel and under nitrogen purge heated to 40° C. 15 parts by weight of sodium methoxide was now added as reaction catalyst and the mixture was heated to 70° C. and kept for 7 hours until a solid product phase precipitated. Obtained solid oligoamide having an average molecular weight of approx. 260 g/mol was washed with 2×200 parts by weight of water and dried in an oven at 50° C. over night.

Step 2: 60.2 parts by weight of the oligoamide obtained in Step 1 above and 12 parts by weight of the acetylenic amide monomer obtained in Step 1 of Example 1 were mixed and heated over nitrogen to a melt at 230° C. The temperature was during 2 hours increased to 270° C. and the mixture was kept at 270° C. for a further 3 hours. The reaction mixture was now allowed to cool to yield a brownish solid product. Obtained acetylenic polyamide 6,6 had a melting point of 236° C. as determined by DSC analysis and an acetylenic content corresponding to 11% by weight of bonded phenyl ethynyl phthalic anhydride.

The invention claimed is:

1. An acetylenic polyamide wherein said acetylenic polyamide by reaction is fitted with at least one acetylenic carbon-carbon triple bond derived from at least one acetylenic compound having said at least one acetylenic carbon-carbon triple bond; said acetylenic compound is a compound of Formula I-VIII

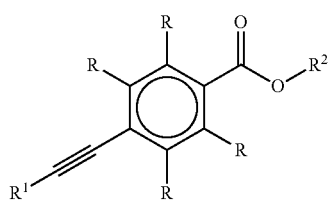

Formula I

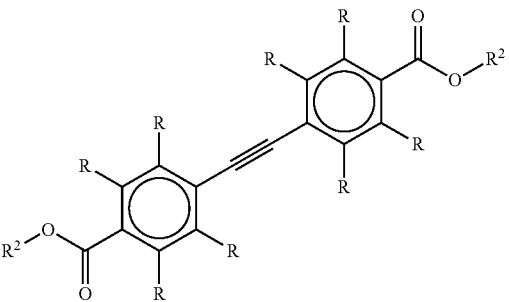

Formula II

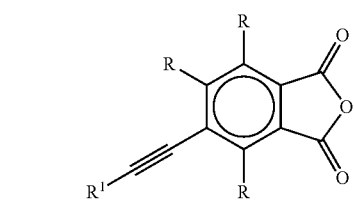

Formula III

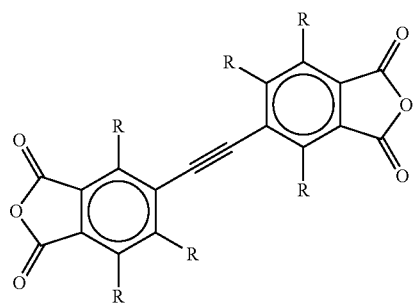

Formula IV

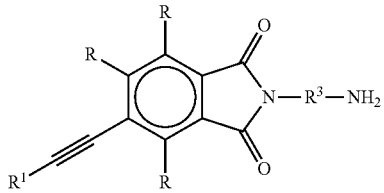

Formula V

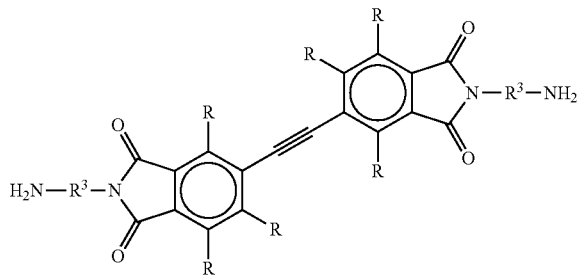

Formula VI

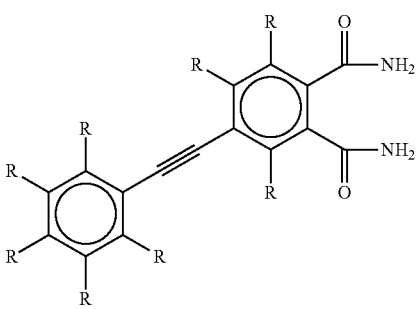

Formula VII

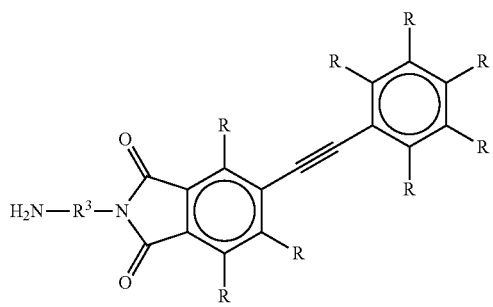

Formula VIII wherein the position in the aromatic ring of acetylenic (carbon-carbon triple bond) is variable and wherein each substituent R individually is hydrogen or a hydroxy, halo or amino group or a linear or branched alkyl, alkenyl, alkynyl, aminoalkyl, aminoalkenyl, aminoalkynyl, haloalkyl, haloalkenyl, haloalkynyl, hydroxyalkyl, hydroxyalkenyl, hydroxyalkynyl, hydroxyacyl or aminoacyl group or an aryl, hydroxyaryl or aminoaryl group, each substituent $R^1$ individually is hydrogen or a hydroxy or halo group or a linear or branched alkyl, alkenyl, hydroxyalkyl, hydroxyalkenyl, haloalkyl or haloalkenyl group, each $R^2$ individually is a linear or branched alkyl, alkenyl, alkynyl or acyl group and each $R^3$ individually is a linear or branched alkyl, alkenyl or alkynyl group or an aryl group; or ethynyl o-phthalic anhydride, methylethynyl o-phthalic anhydride, phenylethynyl o-phthalic anhydride, naphthyl ethynyl o-phthalic anhydride, ethynyl isophthalic acid, methylethynyl isophthalic acid, phenylethynyl isophthalic acid, naphthyl ethynyl isophthalic acid, ethynyl terephthalic acid, methylethynyl terephthalic acid, phenylethynyl terephthalic acid, naphthyl ethynyl terephthalic acid, ethynyl benzoic acid, methylethynyl benzoic acid, phenylethynyl benzoic acid, naphthyl ethynyl benzoic acid, ethynyl adipic acid, methylethynyl adipic acid, phenylethynyl adipic acid, naphthyl ethynyl adipic acid, ethynyl azelaic acid, methylethynyl azelaic acid, phenylethynyl azelaic acid, naphthyl ethynyl azelaic acid, ethynyl sebacic acid, methylethynyl sebacic acid, phenylethynyl sebacic acid, naphthyl ethynyl sebacic acid, ethynyl 2,5-furandicarboxylic acid, methylethynyl 2,5-furandicarboxylic acid, phenyl ethynyl 2,5-furandicarboxylic acid, naphthyl ethynyl 2,5-furandicarboxylic acid and/or a corresponding acid halide or alkyl ester, wherein said acetylenic polyamide comprises monomer units derived from at least one linear or branched aliphatic, cycloaliphatic or aromatic di, tri or polyfunctional amine, at least one aliphatic, cycloaliphatic or aromatic aminoacid and/or at least one lactam;

wherein said acetylenic polyamide comprises monomer units derived from hexamethylene diamine, pentamethylene diamine, 2,2,4-trimethyl-hexamethylene diamine, 2,4,4-trimethyl-hexamethylene diamine, 1,4-diaminobutane, 11-aminoundecanoic acid, 12-aminodecanoic acid, aminocaproic acid caprolactam and/or laurolactam.

2. An acetylenic polyamide according to claim 1, wherein said acetylenic polyamide comprises monomer units derived from at least one linear or branched aliphatic or cycloaliphatic di, tri or polyfunctional carboxylic acid or anhydride or a corresponding acid halide or alkyl ester.

3. An acetylenic polyamide according to claim 2 wherein said linear or branched aliphatic, or cycloaliphatic di, tri or polyfunctional carboxylic acid or anhydride has 2-18 carbon atoms.

4. An acetylenic polyamide according to claim 1, wherein said acetylenic polyamide comprises monomer units derived from oxalic acid, malonic acid, adipic acid, sebacic acid and/or a corresponding acid halide or alkyl ester.

5. An acetylenic polyamide according to claim 1, wherein said acetylenic group is obtained by subjecting at least one said acetylenic compound to reaction with at least one polyamide.

6. An acetylenic polyamide according to claim 1, wherein said acetylenic group is obtained by subjecting at least one said acetylenic compound to reaction with at least one said amine, aminoacid and/or lactam yielding a corresponding acetylenic amide monomer or oligomer, which acetylenic amide monomer or oligomer subsequently is used in the production of a said acetylenic polyamide.

7. An acetylenic polyamide according to claim 1, wherein said acetylenic group is obtained by subjecting at least one said acetylenic compound to co-polymerisation with at least one said amine, aminoacid and/or lactam and optionally at least one said carboxylic acid or anhydride or a corresponding acid halide or alkyl ester, yielding a corresponding acetylenic oligoamide or polyamide.

8. An acetylenic polyamide according to claim 7 wherein a yielded acetylenic oligoamide is used in production of the acetylenic polyamide.

9. An acetylenic polyamide according to claim 1, wherein said acetylenic compound is present in said acetylenic polyamide in an amount corresponding to at least 0.1 mole % of the total molar amount of monomers, oligomers and/or polymers used in production of said acetylenic polyamide.

10. An acetylenic polyamide according to claim 1, wherein said acetylenic compound is present in said acetylenic polyamide in an amount corresponding to between 1 and 30 mole % of the total molar amount of monomers, oligomers and/or polymers used in production of said acetylenic polyamide.

11. A composition comprising at least one acetylenic polyamide according to claim 1, wherein said composition comprises between 0.1 and 99.9% by weight of said acetylenic polyamide.

12. A composition according to claim 11 wherein said composition comprises between 1% and 40% by weight of said acetylenic polyamide.

13. A composition according to claim 12 wherein said composition comprises between 1% and 25% by weight of said acetylenic polyamide.

14. A moulded three-dimensional article wherein said article is obtained by moulding at least one acetylenic polyamide according to claim 1.

* * * * *

UNITED STATES PATENT AND TRADEMARK OFFICE
CERTIFICATE OF CORRECTION

PATENT NO.         : 8,492,507 B2                                                      Page 1 of 1
APPLICATION NO. : 13/120020
DATED              : July 23, 2013
INVENTOR(S)        : Rosenberg et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 182 days.

Signed and Sealed this

Eighth Day of September, 2015

Michelle K. Lee
*Director of the United States Patent and Trademark Office*